July 14, 1931. W. A. BERNARD 1,814,113
HAND TOOL
Filed Jan. 13, 1926
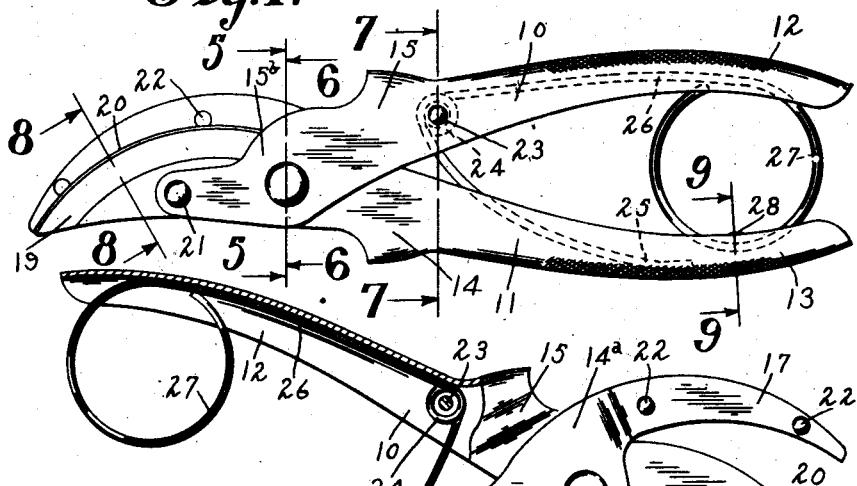
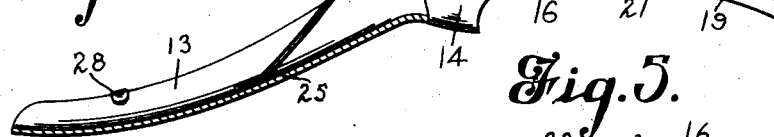
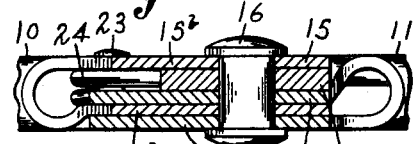
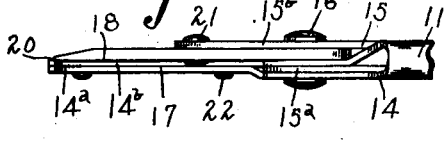
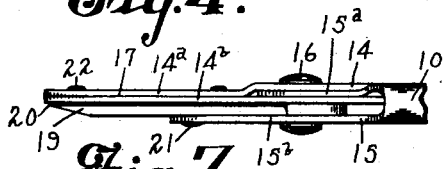
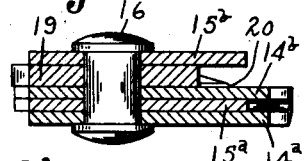
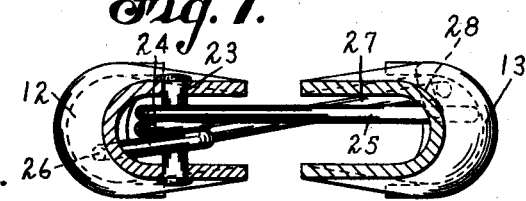
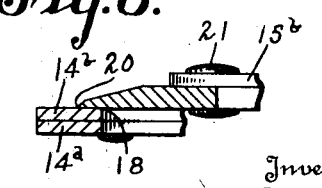
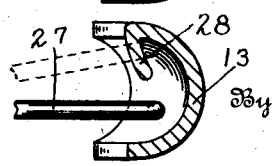
Inventor
William A. Bernard
By Henry E. Rockwell
Attorney Patented July 14, 1931

1,814,113

UNITED STATES PATENT OFFICE

WILLIAM A. BERNARD, OF NEW HAVEN, CONNECTICUT, ASSIGNOR TO THE WILLIAM SCHOLLHORN COMPANY, OF NEW HAVEN, CONNECTICUT

HAND TOOL

Application filed January 13, 1926. Serial No. 81,022.

This invention relates to hand tools and more especially to the type of hand tools or devices for use in pruning shrubs or other plants. More particularly the invention contemplates new and useful improvements in pruning shears and like tools, by providing a novel arrangement therein of the jaws and spring therefor, and a novel construction and arrangement for other operating parts of said tool.

One of the objects of this invention is to provide an improved hand tool of the above type, which will be inexpensive to manufacture and which will efficiently perform the operations required thereof.

Another object of this invention is to generally improve hand tools of the above type, by providing a new and useful jaw construction, in combination with a cutting blade and operating handles.

Still another object of this invention is to provide an improved hand tool, wherein the jaws are formed directly from the material used for the operating handle and in which one of the jaws forms one cutting edge which is adapted to cooperate with an opposed cutting blade.

A still further object of this invention is to provide an improved hand tool of this type, wherein the spring member for use in tending to retain the jaws in open position is of such form and in such an arrangement with the other parts of the tool that the jaws may be retained in closed position and wherein the operating parts adjacent the pivotal joint for the jaws are of such construction and arrangement that the cooperating jaws may be efficiently operated to perform the required operations.

To these and other ends, the invention consists in the novel features and combinations of parts to be hereinafter described and claimed.

In the accompanying drawings:

Fig. 1 illustrates a hand tool embodying the features of this invention;

Fig. 2 is a longitudinal section through the operating handles of the hand tool, shown in Fig. 1, the jaws of the tool being shown in open position;

Fig. 3 is a top edge view of the jaw end of the tool, shown in Fig. 1;

Fig. 4 is a bottom edge view of the jaw end of the tool, shown in Fig. 1;

Fig. 5 is an enlarged section on line 5—5 of Fig. 1;

Fig. 6 is an enlarged section on line 6—6 of Fig. 1;

Fig. 7 is an enlarged section on line 7—7 of Fig. 1;

Fig. 8 is an enlarged section on line 8—8 of Fig. 1; and,

Fig. 9 is an enlarged section on line 9—9 of Fig. 1.

The hand tool selected to illustrate the features of this invention, comprises the crossed members 10 and 11, which in this instance are formed of sheet metal, being substantially U-shaped in cross section at the handle portions 12 and 13, respectively. The arms of the U-shape of each member are extended beyond the hand portions to form bifurcated portions 14 and 15, respectively, at which point the members 10 and 11 cross each other and are pivoted together by a pivot pin 16. The arms $14^a$ and $14^b$ of the bifurcated portion 14, and the arms $15^a$ and $15^b$ of the bifurcated portion 15 are arranged in an inter-engaging member to form a tight yieldable joint at the pivot point thereof. The arms $14^a$ and $14^b$ straddle the arm $15^a$, which terminates adjacent the joint and are then extended beyond the pivoted joint, the arm $14^a$ being struck inwardly toward and into contact with the arm $14^b$, being retained in close contact therewith by means of rivets 22 to form the jaw portion 17. The jaw portion 17, in this instance, forms the concave jaw of a pruning shear, the arm $14^b$ forming one of the shearing blades being provided with a shearing edge 18.

A cutting blade 19 having, in this instance, a convex cutting edge 20, is secured to the arm $15^b$ by means of the pivot pin 16 and a securing means, such as the rivet 21. The blade 19 lies between the arms $14^b$ and $15^b$, being movable by means of the connection with the arm $15^b$ relatively to the arm $14^b$, so that the cutting edge 20 thereof will cooperate with the cutting edge 18 to shear an object placed therebetween when the hand tool is operated.

A pin 23 is extended between the arms of the U-shaped handle 12 adjacent the bifurcated portion 15 and the member 10. A spring 24 is coiled about the pin 23, one end 25 of which is extended into sliding contact with the handle member 13 within the U-shaped section thereof, the other end 26 extending along and in contact with the U-shaped section of the handle 12. This latter end extension 26 is preferably bent into a loop 27. The handles are retained in open position by the unwinding tension on the spring 24 acting upon the handles through the end extensions 25 and 26, respectively.

A member 28 is provided upon the handle 13 and extends laterally over the U-shaped section thereof to form a hook. In this instance, the hook 28 is formed integral with the handle 13, being a lug struck from the material thereof and bent inwardly. The hook or lug 28 is for the purpose of engaging the looped portion 27 when the handles are brought together to close the jaws of the tool in order to hold the same in closed position, as shown in Figs. 1 and 7.

Because of the novel manner in which the laterally coiled spring 24 is arranged upon the pin 23 and disposed relatively to the handles 12 and 13, the loop 27 does not engage with the hook 28 at each closing action of the tool. The loop 27 must be manually sprung laterally with respect to the tool, so as to engage the hook 28 beneath the same in order to retain the tool in closed position. This is accomplished by winding the spring about the pin 23 in such a manner that the end 25 tends to hug the same side of the handle 13 upon which the hook 28 is located, while the end 26 and loop 27 hug the side of the handle 12, which is opposite the side of the tool upon which the lug or hook 28 is located. After engaging the loop 27 with the hook 28, a pressure upon the handles 12 and 13 to further bring them together will release the engagement thereof because the lateral tension on the loop 27 and end 26 will cause the same to assume its normal non-engageable position relatively to the hook 28.

While I have illustrated and described one form of hand tool, embodying the features of my invention, it is to be understood that the invention is not limited thereto in all of its details, but is capable of many modifications and variations which will lie within the spirit of the invention and the scope of the appended claims.

What I claim is:

1. In a hand tool, a pair of members, each being formed from a strip of sheet metal and comprising a handle portion and a bifurcated portion, said members being crossed and pivoted together at their bifurcated portions, the arms of the bifurcated portion of one straddling an arm of the bifurcated portion of the other, and then being brought together into contact to form a jaw member, and a shear blade secured to the free arm of the other member and disposed between the free arm thereof and an adjacent arm of the other member and being in opposed shearing relation to said jaw member.

2. In a hand tool, a pair of operating handles pivoted together intermediate their ends, one of said handles having a projection thereon extending laterally from one edge thereof toward the other end adjacent its outer end, the other of said handles having a coiled spring secured thereto adjacent the pivotal joint, said coil spring having ends extending towards the outer ends of said handles, one spring end being in engagement with one handle and the other end in engagement with the other handle, whereby the spring tension will tend to retain said handles in open position, the spring end in engagement with the handle opposite the handle having the projection being engageable with the projection to hold the handles in closed position, said spring end being under lateral spring tension whereby disengagement thereof from said projection will take place when said handles are further closed together.

3. In a hand tool, a pair of members, each being formed from a strip of sheet metal and each comprising a handle portion and a bifurcated portion, the bifurcated portions of each being extended beyond the handle portions and pivoted together, with an arm of the bifurcated portion of each being straddled by the arms of the bifurcated portions of the other, the straddling arms of one member being brought together to form a jaw and provided with a shearing edge, and a cutting blade secured to one of the arms of the other member in opposed operative position to said shearing edge.

4. In a hand tool, a pair of handle members pivoted together for movement toward and away from each other, a spring member having spring tensioned extensions diverging from an intermediate point of said spring member, said spring member being secured to one handle at the point of divergence, one of said extensions engaging one handle member to urge it away from the other, being manually engageable with the other handle member to retain the handle members together against separation thereby and being automatically releasable therefrom upon movement of said handle members toward each other.

5. In a hand tool, a pair of members, said members being crossed and pivoted together at the point of crossing whereby handle members are formed at one side of the pivot point, and a spring member secured intermediate its ends to one of said handle members, each end portion of said spring member extending from its intermediate portion and engaging a different one of said handle members to urge said handle members apart, the end of said spring member portion adjacent the handle members to which said spring member is secured being formed into a loop, the other handle member having a lug adapted to be engaged by the looped end of said spring member to retain the handle members together, said spring member end portion having the loop being spring tensioned to be normally in lug disengaged position.

6. In a hand tool, a pair of handle members pivoted together for opening and closing movement, a spring member disposed between said handle members and being secured to one, said spring member having a portion extending from the handle member to which it is secured toward the other handle member, and being adapted to engage the same when pressed laterally with respect thereto, said handle member engaging spring portion being spring tensioned for movement laterally away from said last mentioned handle member, whereby it is normally in disengaged position.

7. In a hand tool, a pair of pivoted together and opposed handles, a spring disposed between said handles and having a portion engaging each handle whereby the spring tension thereof will urge said handles away from each other, a hook-like member extending partly across one of said handles and disposed adjacent an end thereof and between said handles, the spring portion engaging the other handle being adapted to be engaged with said hook-like member to retain said handles in substantially closed position, said last mentioned spring portion being tensioned for free lateral movement away from said hook-like member and out of engagement therewith when said handles are further moved toward each other in the closed position direction.

8. In a hand tool, handles movable toward and away from each other, a spring having arms, one arm of said spring engaging one of said handles and the other arm engaging the other handle, said spring being tensioned to urge said handles away from each other, a hook-like member on one of said handles, a loop on the spring arm engaging the handle not having said hook-like member, said spring arm having a loop being tensioned to normally retain said loop out of hook-like member engaging position but permitting the engagement of said loop with said hook-like member to retain said handles in a position assumed thereby when they are moved toward each other.

9. In a hand tool, a pair of opposed handles U-shaped in cross-section, one of said handles having a projection extending laterally and inwardly from one arm of its U-shape toward the other arm thereof, a loop on the other handle, said loop engageable with said projection to retain said handles together and being spring tensioned to automatically move laterally away from said projection into handle releasing position when said handles are moved toward each other.

10. In a hand tool, a pair of opposed handles, one of said handles having a hook-like member thereon, a member secured to the other handle extending toward and engageable with said hook-like member to retain said handles in closed position and being spring tensioned for free lateral movement away from said hook-like member, after engagement therewith, by movement of said handles toward each other.

11. In a hand tool, opposed handles, a hook-like member on one handle and means on the other handle engageable with said hook-like member to retain the handles in substantially closed position, said means being spring tensioned to urge it laterally away from said hook-like member when the handles are further moved toward each other to permit separation of said handles.

In witness whereof, I have hereunto set my hand this 30th day of December, 1925.

WILLIAM A. BERNARD.